United States Patent
Fukumoto et al.

(10) Patent No.: US 11,440,084 B2
(45) Date of Patent: Sep. 13, 2022

(54) METHOD OF MANUFACTURING OUTSIDE JOINT MEMBER

(71) Applicant: JTEKT CORPORATION, Kariya (JP)

(72) Inventors: Yohei Fukumoto, Nagoya (JP); Motonori Nakao, Anjo (JP); Kenichi Kurisu, Anjo (JP); Shuhei Fukuda, Kariya (JP); Kazuya Matsumoto, Kariya (JP)

(73) Assignee: JTEKT CORPORATION, Kariya (JP)

( * ) Notice: Subject to any disclaimer, the term of this patent is extended or adjusted under 35 U.S.C. 154(b) by 263 days.

(21) Appl. No.: 16/719,022

(22) Filed: Dec. 18, 2019

(65) Prior Publication Data

US 2020/0206804 A1    Jul. 2, 2020

(30) Foreign Application Priority Data

Dec. 26, 2018  (JP) .............................. JP2018-243518

(51) Int. Cl.
*B21K 1/76* (2006.01)
*B21J 5/12* (2006.01)
*F16D 3/34* (2006.01)

(52) U.S. Cl.
CPC ................. *B21K 1/765* (2013.01); *B21J 5/12* (2013.01); *F16D 3/34* (2013.01); *F16D 2200/0021* (2013.01); *F16D 2250/0023* (2013.01)

(58) Field of Classification Search
CPC .. B21K 1/762; B21K 1/765; F16D 2250/0023
See application file for complete search history.

(56) References Cited

U.S. PATENT DOCUMENTS

| 5,829,911 A * | 11/1998 | Yokota .................... B21K 1/066 72/359 |
| 2004/0035168 A1* | 2/2004 | Kanamaru ............... B21K 1/30 72/60 |
| 2018/0193138 A1* | 7/2018 | Vidlund ................ A61F 2/2418 |
| 2019/0193138 A1* | 6/2019 | Lee ......................... B21K 1/765 |
| 2019/0366422 A1* | 12/2019 | Mizushima .............. B21J 5/022 |

FOREIGN PATENT DOCUMENTS

| JP | 2005-231475 A | 9/2005 | |
| JP | 2007-270345 A | 10/2007 | |
| KR | 20130129774 A * | 11/2013 | ............. B21K 1/762 |
| WO | WO-2016006803 A1 * | 1/2016 | ............. B21C 23/08 |
| WO | WO-2018179928 A1 * | 10/2018 | ................ B21J 5/10 |

* cited by examiner

*Primary Examiner* — Jessica Cahill
*Assistant Examiner* — Katie L. Parr
(74) *Attorney, Agent, or Firm* — Oblon, McClelland, Maier & Neustadt, L.L.P.

(57) ABSTRACT

A method of manufacturing an outside joint member, the outside joint member including a cup portion in a bottomed tubular shape and a shaft portion that is a shaft-like portion extending from a bottom portion of the cup portion and that has a spline shaft having an outer peripheral surface on which spline teeth are formed, includes forging a forming material to form a shape of the cup portion and a shape of the spline shaft on the shaft portion simultaneously using a forging die.

7 Claims, 7 Drawing Sheets

METHOD OF MANUFACTURING OUTSIDE JOINT MEMBER

INCORPORATION BY REFERENCE

The disclosure of Japanese Patent Application No. 2018-243518 filed on Dec. 26, 2018 including the specification, drawings and abstract is incorporated herein by reference in its entirety.

BACKGROUND

1. Technical Field

The present disclosure relates to a method of manufacturing an outside joint member.

2. Description of Related Art

There is known a constant-velocity joint that includes an outside joint member in a bottomed tubular shape, an inside joint member disposed on the inner side of the outside joint member, and balls that transfer torque between the outside joint member and the inside joint member.

Japanese Unexamined Patent Application Publication No. 2007-270345 (JP 2007-270345 A) discloses a method of manufacturing an outer ring member (outside joint member), including a step of plastically deforming a heated workpiece (forming material), a step of performing heat treatment on the workpiece that has been plastically deformed, and a step of performing ironing on the workpiece that has been subjected to the heat treatment. Meanwhile, Japanese Unexamined Patent Application Publication No. 2005-231475 (JP 2005-231475 A) discloses a technique of performing form rolling on a drive shaft (shaft portion) provided to a constant-velocity joint to form a male spline and thereafter performing induction hardening on the male spline.

SUMMARY

The methods of manufacturing an outside joint member described above involve many steps, and require a long cycle time.

The present disclosure provides a method of manufacturing an outside joint member that can shorten the cycle time.

One aspect of the present disclosure provides a method of manufacturing an outside joint member, the outside joint member including a cup portion in a bottomed tubular shape and a shaft portion that is a shaft-like portion extending from a bottom portion of the cup portion and that has a spline shaft having an outer peripheral surface on which spline teeth are formed, the manufacturing method including forging a forming material to form a shape of the cup portion and a shape of the spline shaft on the shaft portion simultaneously using a forging die. With the method of manufacturing an outside joint member according to the one aspect of the present disclosure, the cycle time can be shortened compared to a case where the spline shaft is shaped separately from the forging step.

The method of manufacturing an outside joint member according to the one aspect of the present disclosure may further include performing rough forging of the forming material for the cup portion and the shaft portion. The forging may include forging the forming material that has been subjected to the rough forging to form the shape of the spline shaft using the forging die simultaneously while performing finish forging of the cup portion and the shaft portion.

In the method of manufacturing an outside joint member according to the one aspect of the present disclosure, the shape of the cup portion and the shape of the spline shaft may be formed simultaneously by warm forging.

In the method of manufacturing an outside joint member according to the one aspect of the present disclosure, the forging die may include a spline shaping portion having an inner peripheral surface shape corresponding to an outer shape of the spline shaft and configured to shape the spline teeth at a portion at which the spline shaft is to be formed in the forging. The spline shaping portion may include spline shaping teeth and distal end teeth. The spline shaping teeth may correspond to a plurality of tooth grooves provided in the spline shaft. The distal end teeth may be provided continuously with the spline shaping teeth on an entrance side, the entrance being an entrance to the forging die into which the forming material is inserted in the forging. The distal end teeth may become narrower toward the entrance side. The spline shaping teeth may each include a shaping tooth top surface corresponding to a bottom surface of each of the tooth grooves of the spline shaft and a pair of shaping tooth side surfaces corresponding to side surfaces of each of the tooth grooves of the spline shaft. The distal end teeth may each include a distal end tooth top surface and a pair of distal end tooth side surfaces. The distal end tooth top surface may be provided continuously with the shaping tooth top surface on the entrance side, and may become smaller in height toward the entrance side. The pair of distal end tooth side surfaces may be provided continuously with the pair of shaping tooth side surfaces on the entrance side, and may become smaller in width in a circumferential direction toward the entrance side.

In the method of manufacturing an outside joint member according to the one aspect of the present disclosure, the distal end tooth top surface may become smaller in the width in the circumferential direction toward the entrance side.

In the method of manufacturing an outside joint member according to the one aspect of the present disclosure, the distal end teeth may each be formed in a pointed spear shape. The distal end teeth may be configured such that the distal end tooth top surface and the distal end tooth side surfaces converge at one point at an end portion on the entrance side.

In the method of manufacturing an outside joint member according to the one aspect of the present disclosure, the forging die may include a spline shaping portion and a regulation portion. The spline shaping portion may have an inner peripheral surface shape corresponding to an outer shape of the spline shaft, and may be configured to shape the spline teeth at a portion at which the spline shaft is to be formed in the forging. The regulation portion may be provided on an entrance side with respect to the spline shaping portion. The entrance is an entrance to the forging die into which the forming material is inserted in the forging. The regulation portion may have a regulation surface that regulates displacement of the forming material in a radial direction.

In the method of manufacturing an outside joint member according to the one aspect of the present disclosure, the regulation surface may be a cylindrical inner peripheral surface that has an inside diameter corresponding to an outside diameter of the forming material that is inserted into the spline shaping portion in the forging.

In the method of manufacturing an outside joint member according to the one aspect of the present disclosure, the forging die may include a guide portion provided on the entrance side with respect to the regulation portion and having an inside diameter that becomes larger toward the entrance side.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

1. Schematic Configuration of Constant-Velocity Joint 100

A method of manufacturing an outside joint member according to the present disclosure will be described below with reference to the drawings. First, a schematic configuration of a constant-velocity joint 100 in which an outside joint member manufactured by a manufacturing method according to the present disclosure is used will be described with reference to FIG. 1.

In general, a constant-velocity joint includes at least an outside joint member, an inside joint member, and rolling elements. The constant-velocity joint is suitably used as an outboard joint for a front drive shaft, for example, and may be a variety of joints such as a ball-type joint and a tripod-type joint. Examples of the ball-type joint include a fixed ball-type constant-velocity joint (such as BJ and UFJ) and a sliding ball-type constant-velocity joint (such as DOJ and LJ). In the present embodiment, the fixed ball-type constant-velocity joint is taken as an example of the constant-velocity joint.

Figure 1:
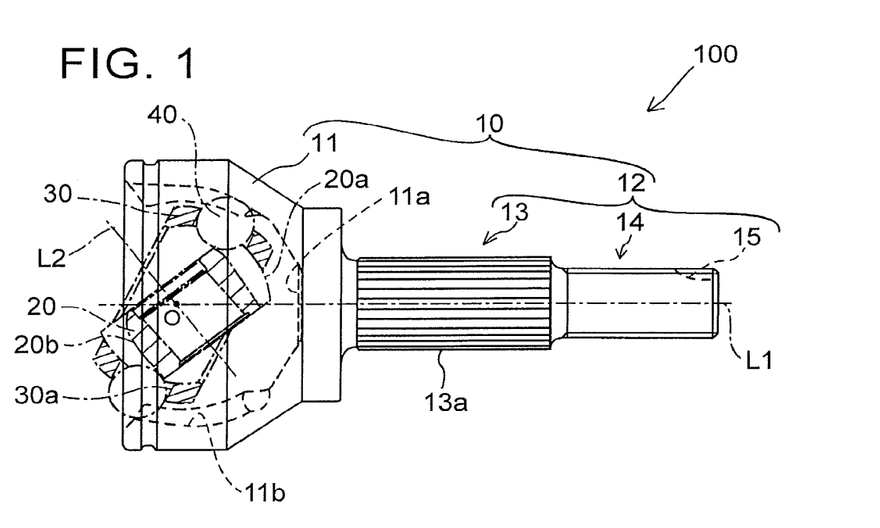
FIG. 1 illustrates an axial section of a constant-velocity joint that includes an outside joint member manufactured by a manufacturing method according to the present disclosure.

As illustrated in FIG. 1, the constant-velocity joint 100 includes an outside joint member 10, an inside joint member 20, six balls 40 that serve as rolling elements, and a cage 30.

In FIG. 1, the inside joint member 20, the balls 40, and the cage 30 are indicated by hidden outlines (long dashed short dashed lines).

The outside joint member 10 includes a cup portion 11 in a bottomed tubular shape that opens on one side (left side in FIG. 1) in the direction of a central axis L1, and a shaft portion 12 formed integrally with the cup portion 11 to extend toward the other side (right side in FIG. 1) in the direction of the central axis L1. The cup portion 11 is formed with an outside ball groove portion 11b formed in an inner peripheral surface 11a of the cup portion 11. The inner peripheral surface 11a has a concave spherical shape. The outside ball groove portion 11b extends in the direction of the central axis L1. The shaft portion 12 is a shaft-like portion that extends from the bottom portion of the cup portion 11. The shaft portion 12 is formed with a spline shaft 13 coupled to a different power transfer shaft (not illustrated), a threaded shaft 14 including an outer peripheral surface on which a male thread is formed, and a engagement groove portion 15 provided in the threaded shaft 14. The spline shaft 13 is a male spline having an outer peripheral surface on which a plurality of spline teeth 13a is formed to extend in the axial direction.

The inside joint member 20 is formed in an annular shape, and formed with an inside ball groove portion 20b formed in an outer peripheral surface 20a of the inside joint member 20. The outer peripheral surface 20a has a convex spherical shape. The inside ball groove portion 20b extends in the direction of a central axis L2. The cage 30 is formed with a plurality of window portions 30a that can accommodate and hold one ball 40 each. The cage 30 is disposed between the inner peripheral surface 11a of the outside joint member 10 and the outer peripheral surface 20a of the inside joint member 20. The balls 40 that are held by the cage 30 are rollably disposed between the outside ball groove portion 11b and the inside ball groove portion 20b.

The inside joint member 20 is relatively rotated about a joint center O with respect to the outside joint member 10 while rolling the balls 40. That is, the inside joint member 20 can make an angle (joint angle) with respect to the outside joint member 10. The cage 30 is rotated about the joint center O along with rolling of the balls 40. The balls 40 that are held by the cage 30 transfer torque between the outside joint member 10 and the inside joint member 20.

2. Step of Manufacturing Outside Joint Member 10

Next, a step of manufacturing the outside joint member 10 will be described with reference to the flowchart illustrated in FIG. 2.

Figure 2:
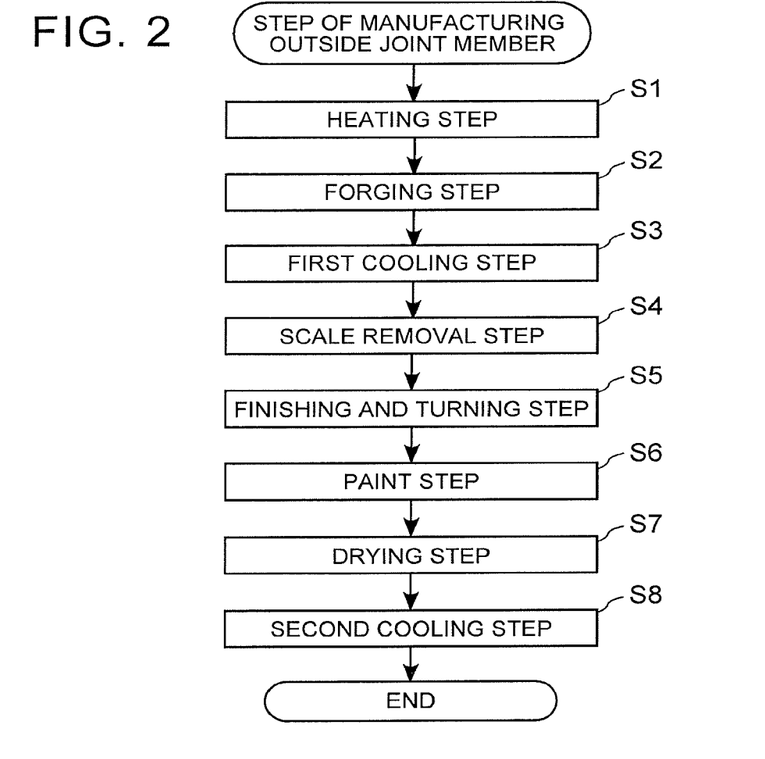
FIG. 2 is a flowchart illustrating a step of manufacturing the outside joint member.

As illustrated in FIG. 2, a heating step (S1) in which a forming material B (billet) to form the outside joint member 10 is heated is executed as the first step of the step of manufacturing the outside joint member 10. When the heating step (S1) is ended, a forging step (S2) in which the forming material B that has been heated is forged is executed in the step of manufacturing the outside joint member 10. The forging in the forging step (S2) is warm forging, and the forming material B that has been heated in the heating step (S1) is plastically deformed. In the forging step (S2), the forming material B is formed into the cup portion 11 and the shaft portion 12, and the shaft portion 12 is formed with the spline teeth 13a at a portion at which the spline shaft 13 is to be formed. The forging step (S2) will be described in detail later.

When the forging step (S2) is ended, a first cooling step (S3) in which the forming material B after being forged is cooled is executed in the step of manufacturing the outside joint member 10. In the step of manufacturing the outside joint member 10, a process of hardening the forming material B is executed in parallel with the processes from the heating step (S1) to the first cooling step (S3). That is, in the step of manufacturing the outside joint member 10, the forging step (S2) is performed in a short time (e.g. 40 seconds) such that the hardening process can be started with the temperature of the forming material B that has been heated in the heating step (S1) reaching a predetermined temperature range. In the heating step (S1) of the step of manufacturing the outside joint member 10, the forming material B is heated to such a temperature range that the temperature of the forming material B after being forged is suitable to start cooling in the hardening process.

In this way, in the step of manufacturing the outside joint member 10, heat applied to the forming material B through the heating step (S1) and the forging step (S2) is utilized as heat for the process of hardening the forming material B. That is, in the step of manufacturing the outside joint member 10, the process of hardening the forming material B can be performed by cooling the forming material B, for which the forging step (S2) has been ended.

In this case, a step of heating the forming material B that has been cooled once can be omitted from the step of manufacturing the outside joint member 10 when the step of hardening the forming material B is to be performed after the forging, which can shorten the cycle time. In the step of manufacturing the outside joint member 10, further, the number of heating processes can be reduced, which can suppress the cost of installation of heating equipment and the cost of energy consumed for heating.

While heat of the forming material B that has been heated in the heating step (S1) is utilized for the hardening process in the present embodiment, the present disclosure is not limited thereto. That is, in the step of manufacturing the outside joint member 10, the forming material B that has been cooled after the forging may be heated again before execution of the hardening process. In this case, the forging in the forging step (S2) may not necessarily be warm forging, and may be cold forging. Also in this case, the spline teeth 13a are formed in the forging step (S2) in the step of manufacturing the outside joint member 10, which can shorten the cycle time.

When the hardening step (S3) is ended, a scale removal step (S4) in which scales formed on the forming material B are removed is executed in the step of manufacturing the outside joint member 10. In the scale removal step (S4), scales that adhere to the surface of the forming material B that has been oxidized in the hardening process are removed. Specifically, the scale removal step (S4) includes removing the scales that adhere to the forming material B through shot blasting (that uses alumina particles etc.), shot peening, barrel processing, wet blasting, etc.

After the scale removal step (S4) is ended, a finishing and turning step (S5) in which the forming material B is finished and turned is executed in the step of manufacturing the outside joint member 10. In the finishing and turning step (S5), the cup portion 11 is finished, turning is performed to form an outer peripheral groove in the outer peripheral surface of the cup portion 11, turning is performed to form a male thread and the engagement groove portion 15 at a portion of the shaft portion 12 at which the threaded shaft 14 is to be formed, etc.

In the step of manufacturing the outside joint member 10, the spline shaft 13 is shaped through forging before the hardening process, while the threaded shaft 14 and the engagement groove portion 15 are formed through turning after the hardening process. In this respect, in the present embodiment, a steel material (S55C) containing 0.40% to 0.60% of carbon is used for the forming material B, and therefore the forming material B after the hardening process has a high hardness. In the case where it is attempted to form the spline teeth 13a at a portion of the forming material B at which the spline shaft 13 is to be formed after the hardening process through cutting etc., it takes a long time to form the spline teeth 13a, which increases the cycle time.

Thus, in the step of manufacturing the outside joint member 10 according to the present embodiment, the spline teeth 13a are formed by forging a portion at which the spline shaft 13 is to be formed in the forging step (S2) that is executed before the hardening step (S3). Consequently, it is possible to both shorten the cycle time and improve the precision in processing the spline teeth 13a in the step of manufacturing the outside joint member 10 according to the present embodiment. Additionally, a step of performing form rolling can be omitted from the step of manufacturing the outside joint member 10 according to the present embodiment by forming the spline teeth 13a through forging at a portion at which the spline shaft 13 is to be formed and forming a male thread through turning at a portion at which the threaded shaft 14 is to be formed. Hence, the cycle time can be shortened in the step of manufacturing the outside joint member 10 according to the present embodiment.

After the finishing and turning step (S5) is ended, a paint step (S6) in which the forming material B is painted is executed in the step of manufacturing the outside joint member 10. After the paint step (S6) is ended, subsequently, a drying step (S7) in which a paint applied to the forming material B is dried is executed in the step of manufacturing the outside joint member 10. In the drying step (S7), heat for drying is applied to the forming material B to dry the paint.

After the drying step (S7) is ended, a second cooling step (S8) in which the forming material B that has been heated in the drying step (S7) is cooled is executed in the step of manufacturing the outside joint member 10. In the step of manufacturing the outside joint member 10, a process of tempering the forming material B is executed in parallel with the processes of the drying step (S7) and the second cooling step (S8). That is, in the step of manufacturing the outside joint member 10, the forming material B is heated in the drying step (S7) such that the tempering process can be started with the temperature of the forming material B that has been heated by heat applied for drying in the drying step (S7) being within a predetermined temperature range.

In the step of manufacturing the outside joint member 10, heat applied to the forming material B in the drying step (S7) is utilized as heat for the process of tempering the forming material B. That is, in the step of manufacturing the outside joint member 10, the process of tempering the forming material B can be performed by cooling the forming material B, for which the drying step (S7) has been ended.

Hence, the cycle time can be shortened in the step of manufacturing the outside joint member 10 according to the present embodiment. In the step of manufacturing the outside joint member 10, further, the number of heating processes can be reduced, which can significantly suppress the cost of installation of heating equipment and the cost of energy consumed for heating.

In the method of manufacturing the outside joint member 10 according to the present embodiment, heat applied in the drying step (S7) is utilized as heat applied for the tempering process. However, heat applied for the tempering process may be applied separately from the drying process. In this case, the paint drying process and the tempering process can be performed in respective temperature zones that are appropriate for the paint drying process and the tempering process in the step of manufacturing the outside joint member 10, which can reliably avoid occurrence of a paint burn or a failure in the tempering process.

3. Forging

Figure 3:
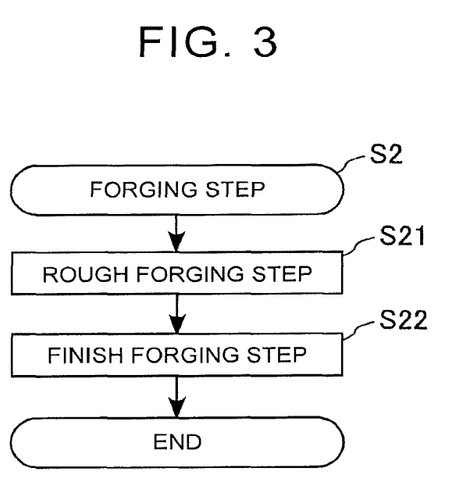
FIG. 3 is a flowchart illustrating a forging step executed during the step of manufacturing the outside joint member.

Next, the forging step (S2) that is executed during the step of manufacturing the outside joint member 10 will be described. As described above, the forging that is performed in the forging step (S2) is warm forging. As illustrated in FIG. 3, the forging step (S2) includes a rough forging step (S21) and a finish forging step (S22).

Figure 4:
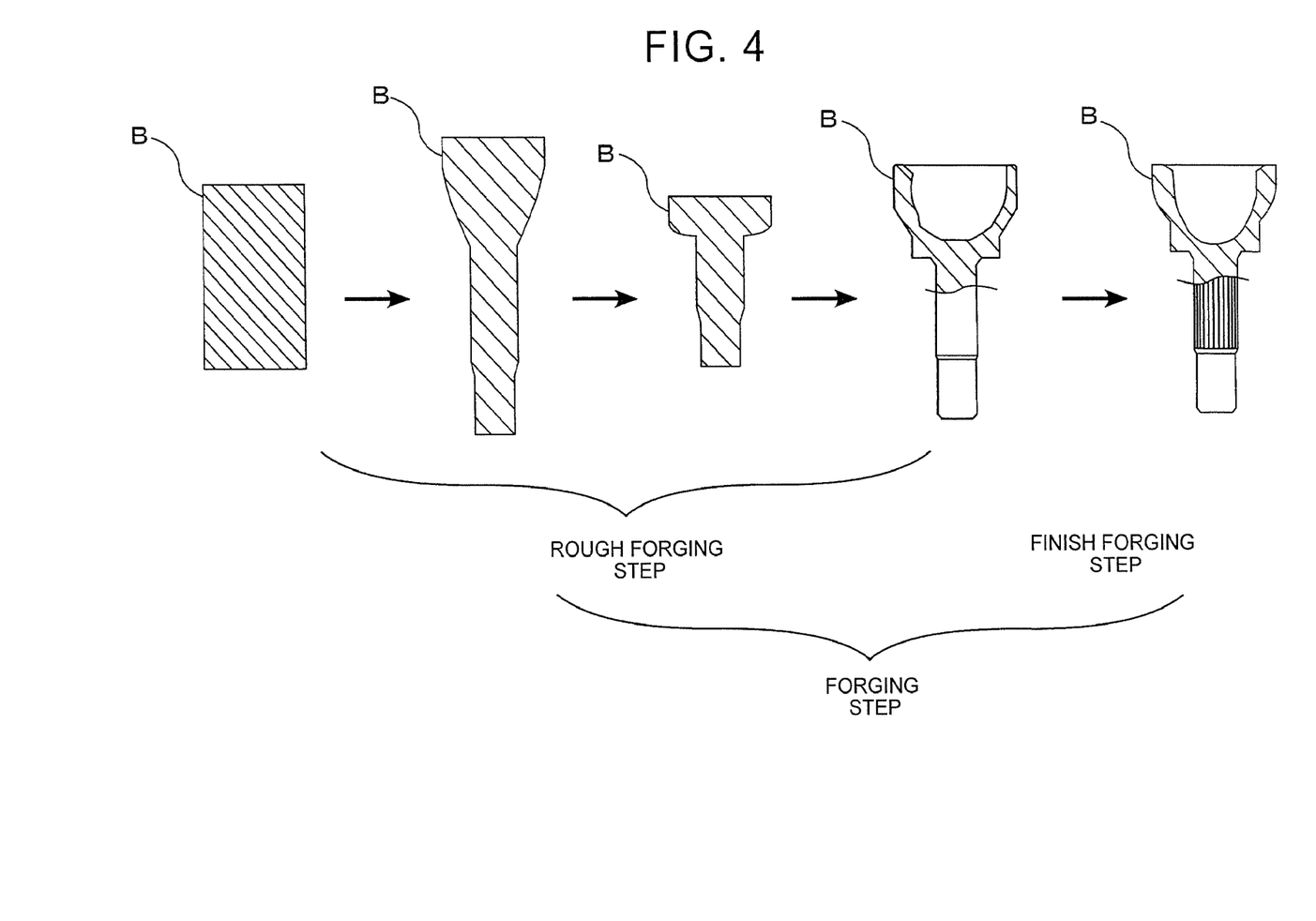
FIG. 4 illustrates the shape of a forming material forged in the forging step for each step.

As illustrated in FIG. 4, the forming material B is forged three times in the rough forging step (S21), and the cup portion 11 and the shaft portion 12 are shaped roughly in the forming material B, for which the rough forging step (S21) has been ended. In the finish forging step (S22), the spline teeth 13a are shaped by forging at a portion at which the spline shaft 13 is to be formed while the forming material B that has been roughly forged is subjected to finish forging for the cup portion 11 and the shaft portion 12.

In this way, the cup portion 11 and the spline shaft 13 of the shaft portion 12 are shaped simultaneously in the finish forging step (S22) that is one step of the forging step (S2). Hence, with the step of manufacturing the outside joint member 10, the cycle time can be shortened compared to a case where the spline shaft 13 is shaped separately from the forging step (S2).

4. Die Device 50

Figure 5A:
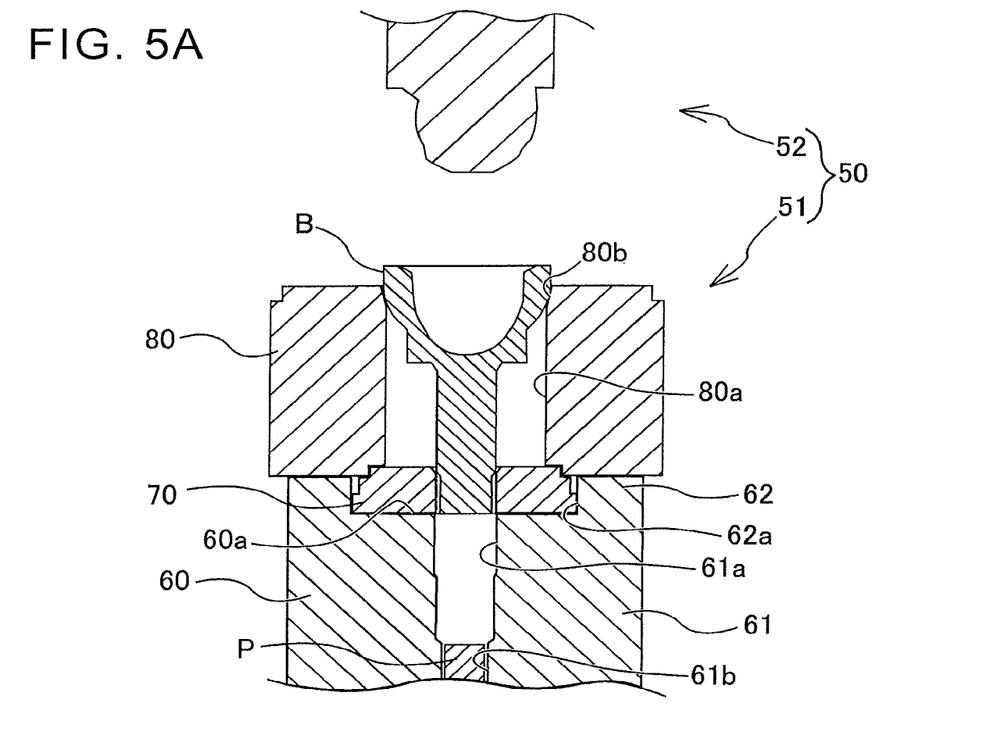
FIG. 5A illustrates a state in which the forming material is disposed in a die, before the forming material is pushed out by a punch.

Next, a die device 50 for use in the finish forging step (S22) will be described with reference to FIGS. 5A and 5B. As illustrated in FIG. 5A, the die device 50 mainly includes a die 51 and a punch 52. The die device 50 is formed from a super hard material, and the die 51 and the punch 52 are coated in order to prevent a seizure.

In the finish forging in which the die device 50 is used, the forming material B that has been roughly forged is inserted into the die 51 from the upper side in FIG. 5A. Then, the punch 52 of the die device 50 is inserted into the die 51 on the upper side of the forming material B to perform ironing. In the following, the upper side in FIGS. 5A and 5B is referred to as the "entrance side".

The die 51 is formed by combining a plurality of members formed in a cylindrical shape. Specifically, the die 51 includes a first die 60, a second die 70 housed in the first die 60, and a third die 80 disposed on the entrance side with respect to the first die 60 and the second die 70. The first die 60, the second die 70, and the third die 80 are disposed coaxially with each other.

The first die 60 is formed so as to be able to house a portion of the forming material B, which has been subjected to finish forging, at which the shaft portion 12 is to be formed. The first die 60 includes a first housing portion 61 and a second housing portion 62 provided on the entrance side of the first housing portion 61.

The first housing portion 61 is formed with a cylindrical inner peripheral surface 61a that has an inside diameter that is larger than the outside diameter of a portion of the forming material B, which has been subjected to finish forging, at which the shaft portion 12 is to be formed. The first housing portion 61 is formed with a pin housing portion 61b at a position on the opposite side (lower side in FIG. 5A) of the cylindrical inner peripheral surface 61a from the entrance side. The pin housing portion 61b movably houses a knockout pin P that pushes out the forming material B toward the entrance side.

The second housing portion 62 is formed with a cylindrical inner peripheral surface 62a that has an inside diameter that is larger than that of the cylindrical inner peripheral surface 61a formed on the first housing portion 61. The cylindrical inner peripheral surface 62a that is formed on the second housing portion 62 and the cylindrical inner peripheral surface 61a that is formed on the first housing portion 61 are connected to each other by a connection surface 60a in a circular ring shape that is orthogonal to the central axis of the first die 60.

The second die 70 shapes the plurality of spline teeth 13a on the outer peripheral surface of a portion of the forming material B at which the spline shaft 13 is to be formed in the finish forging step (S22). The second die 70 will be described in detail later.

The third die 80 shapes the outer peripheral surface of the cup portion 11 in the finish forging step (S22). The third die 80 is formed with a cylindrical inner peripheral surface 80a that has an inside diameter corresponding to the outside diameter of the cup portion 11. The portion of connection between the upper surface (a surface that faces the entrance side) of the third die 80 and the cylindrical inner peripheral surface 80a is formed with an engagement surface 80b, the diameter of which becomes larger toward the entrance side.

When the die device 50 is to perform finish forging on the forming material B that has been roughly forged, the forming material B after being roughly forged is disposed inside the third die 80 as illustrated in FIG. 5A. The outside diameter of a portion of the forming material B, which has been roughly forged, at which the cup portion 11 is to be formed is larger than the inside diameter of the cylindrical inner peripheral surface 80a of the third die 80. In the forming material B which is disposed inside the third die 80, the portion of the forming material B at which the cup portion 11 is to be formed is engaged with the engagement surface 80b.

Figure 5B:
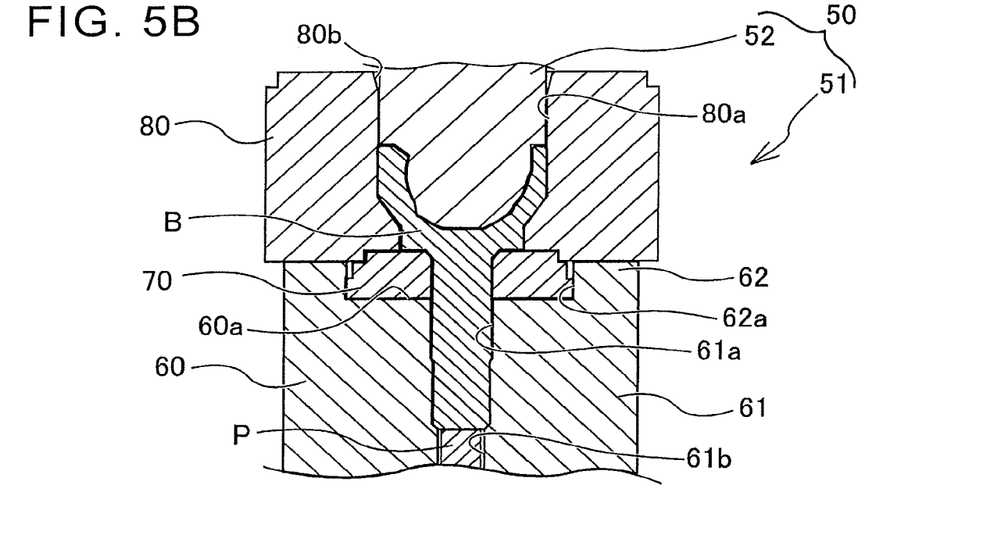
FIG. 5B illustrates a state in which the forming material that is disposed in the die is pushed out by the punch.

As illustrated in FIG. 5B, the punch 52 is inserted into the third die 80 with the forming material B disposed in the die 51. Consequently, the forming material B that is disposed in the die 51 is pushed out by the punch 52, and ironing is performed on the outer peripheral surface of a portion of the forming material B at which the cup portion 11 is to be formed. In addition, a portion of the punch 52 that contacts the forming material B when the punch 52 pushes out push out the forming material B is formed in a shape corresponding to the shape of the inner peripheral surface of the outside joint member 10. Hence, the forming material B is forged in the finish forging step (S22) to form the shape of the inner peripheral surface of the cup portion 11.

In addition, a portion of the forming material B at which the spline shaft 13 is to be formed is pushed out toward the inside of the second die 70 from the entrance side to forge the plurality of spline teeth 13a on the outer peripheral surface of the portion of the forming material B. Of the portion of the forming material B at which the shaft portion 12 is to be formed, a portion that has passed through the inside of the second die 70 is housed inside the cylindrical inner peripheral surface 61a of the first housing portion 61.

It is desirable that a water-soluble lubricant should be applied to the inner peripheral surface of the second die 70. Consequently, the second die 70 can suppress a sliding resistance caused when the forming material B is pushed out.

Figure 6A:
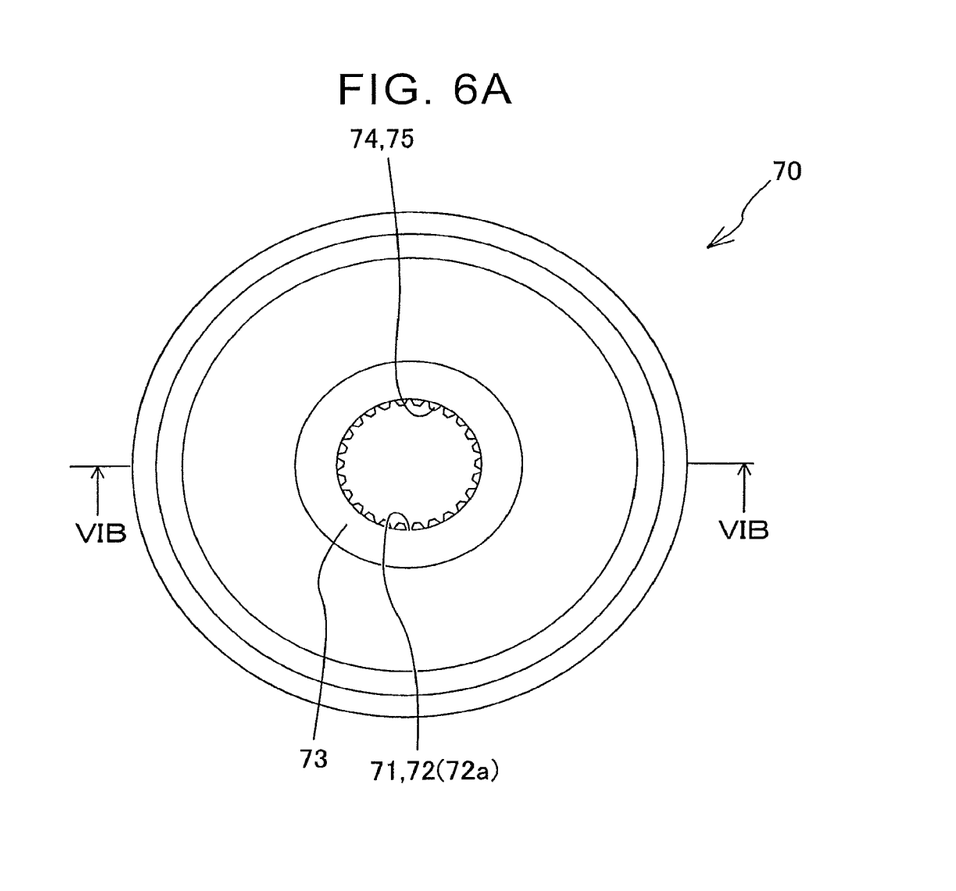
FIG. 6A illustrates a second die as seen in the direction of a central axis.
Figure 6B:
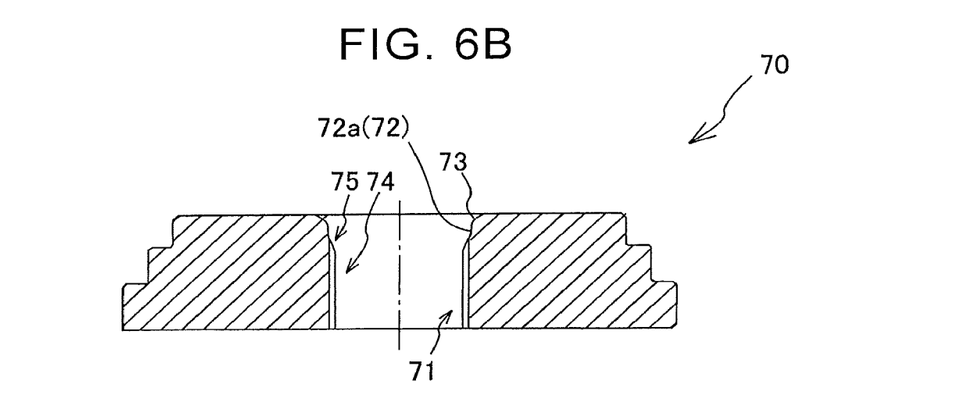
FIG. 6B is a sectional view of the second die taken along the line VIB-VIB in FIG. 6A.

The second die 70 will be described with reference to FIGS. 6A to 7B. As illustrated in FIGS. 6A and 6B, the second die 70 includes a spline shaping portion 71, a regulation portion 72 formed on the entrance side of the spline shaping portion 71, and a guide portion 73 formed on the entrance side of the regulation portion 72.

The spline shaping portion 71 is a portion that has the shape of the inner peripheral surface corresponding to the outer shape of the spline shaft 13. The spline shaping portion 71 shapes the spline teeth 13a by plastically deforming the outer peripheral surface of a portion of the forming material B, which has been roughly forged, at which the spline shaft 13 is to be formed, in forging in the finish forging step (S22).

The regulation portion 72 has, as the inner peripheral surface thereof, a regulation surface 72a that regulates displacement of the forming material B in the radial direction when the portion of the forming material B, which has been roughly forged, at which the spline shaft 13 is to be formed is pushed out toward the spline shaping portion 71. Consequently, the second die 70 can enhance the coaxiality between the spline shaft 13 and other portions (such as the cup portion 11 and the threaded shaft 14) that constitute the outside joint member 10.

In the present embodiment, the regulation surface 72a is a cylindrical inner peripheral surface that has an inside diameter corresponding to the outside diameter of a portion of the forming material B, which has been roughly formed, at which the spline shaft 13 is to be formed. However, the applicable embodiment is not limited thereto. That is, the regulation surface 72a may have any shape (such as a regular polygon shape, for example) other than the cylindrical inner peripheral surface as long as the regulation surface 72a can regulate displacement of the forming material B in the radial direction.

The guide portion 73 is a portion that smoothly guides a portion of the forming material B at which the shaft portion 12 is to be formed to the regulation portion 72. The guide portion 73 is formed such that the inside diameter of the guide portion 73 is larger than the outside diameter of the shaft portion 12 and becomes larger toward the entrance side.

In the step of manufacturing the outside joint member 10 described above, it is required that the forging step (S2) should be performed in a short time to perform the hardening process utilizing heat applied to heat the forming material B in the heating step (S1). In view of this, the second die 70 is provided with the guide portion 73 to be able to smoothly guide the forming material B toward the inside of the regulation surface 72a. Hence, the die device 50 allows forging in the finish forging step (S22) to be performed smoothly and reliably.

Figure 7A:
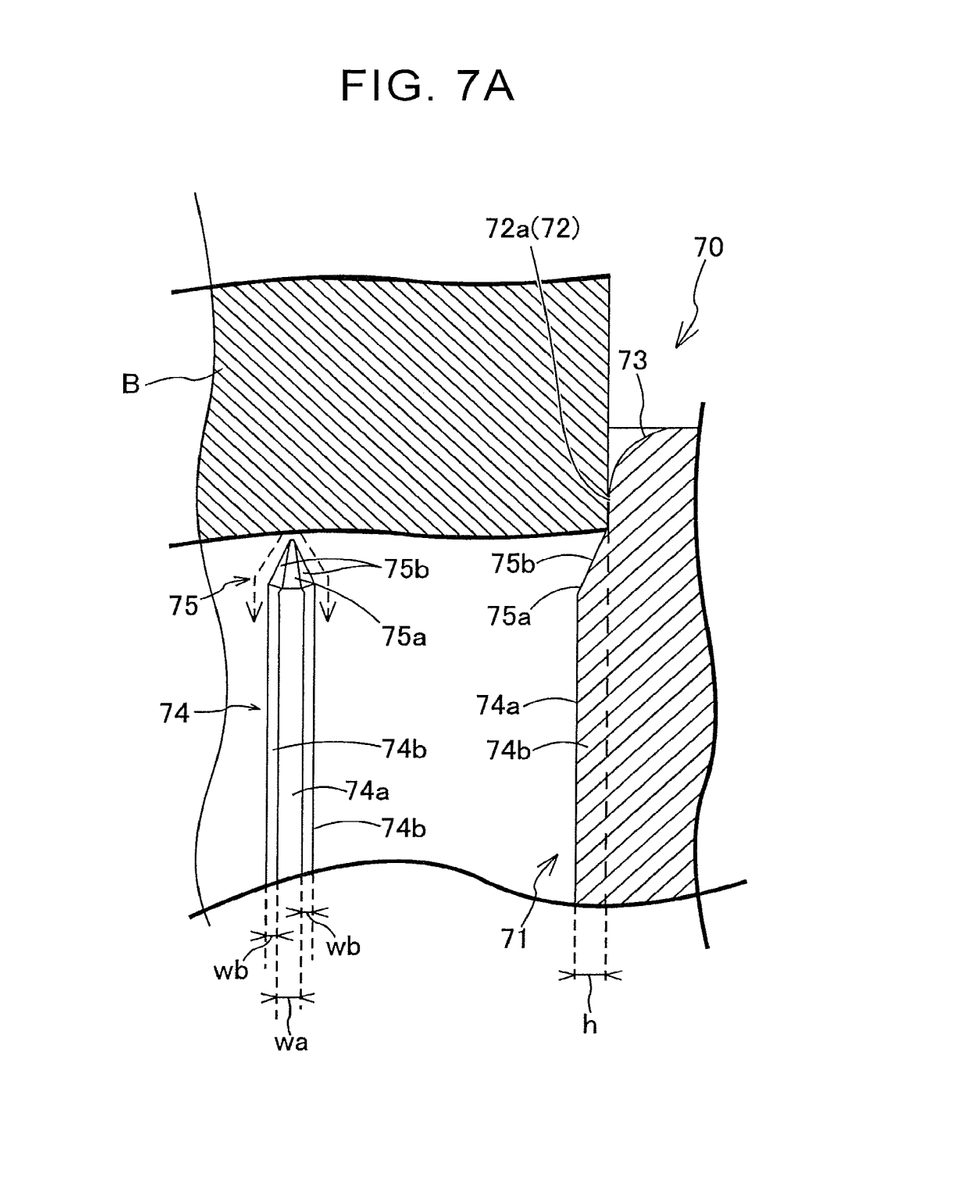
FIG. 7A illustrates a part of FIG. 6B as enlarged, illustrating a state in which a portion of the forming material at which a spline shaft is to be formed is inserted into a regulation portion.

Subsequently, the spline shaping portion 71 will be described in detail. As illustrated in FIG. 7A, the spline shaping portion 71 includes a plurality of spline shaping teeth 74 and a plurality of distal end teeth 75 formed continuously with respective ones of the spline shaping teeth 74 on the entrance side. In FIG. 7A, in order to simplify illustration, only some of the spline shaping teeth 74 and the distal end teeth 75 that are formed on the spline shaping portion 71 are illustrated.

The spline shaping teeth 74 are formed in a shape corresponding to tooth grooves formed in the spline shaft 13 between the spline teeth 13a that are adjacent to each other in the circumferential direction. Specifically, the spline shaping teeth 74 each include a shaping tooth top surface 74a corresponding to the bottom surface of each of the tooth grooves that are formed in the spline shaft 13, and a pair of shaping tooth side surfaces 74b corresponding to the side surfaces of each of the tooth grooves that are formed in the spline shaft 13. The sectional shape of the spline shaping teeth 74 that is orthogonal to the direction of the central axis of the second die 70 is the same over the entire region in the direction of the central axis of the second die 70. That is, a height h (the dimension of projection from the regulation surface 72a toward the radially inner side) of the shaping tooth top surfaces 74a is the same over the entire region in the direction of the central axis of the second die 70. Likewise, a width wa of the shaping tooth top surface 74a in the circumferential direction and a width wb of the shaping tooth side surfaces 74b in the circumferential direction are the same over the entire region in the direction of the central axis of the second die 70.

On the other hand, the distal end teeth 75 are formed so as to be tapered toward the entrance. Specifically, the distal end teeth 75 each include a distal end tooth top surface 75a formed continuously with the shaping tooth top surface 74a on the entrance side, and a pair of distal end tooth side surfaces 75b formed continuously with the respective shaping tooth side surfaces 74b on the entrance side.

In addition, the height h (the dimension of projection from the regulation surface 72a toward the radially inner side) of the distal end tooth top surface 75a becomes smaller toward the entrance side. Likewise, the width wa of the distal end tooth top surface 75a in the circumferential direction and the width wb of distal end tooth side surfaces 75b in the circumferential direction become smaller toward the entrance side. Consequently, the distal end teeth 75 can cause a portion that contacts the distal end teeth 75 to flow toward both sides, in the circumferential direction, of the spline shaping teeth 74 while moving in the axial direction of the second die 70 when a portion of the forming material B at which the spline shaft 13 is to be formed is pushed out into the spline shaping portion 71.

Figure 7B:
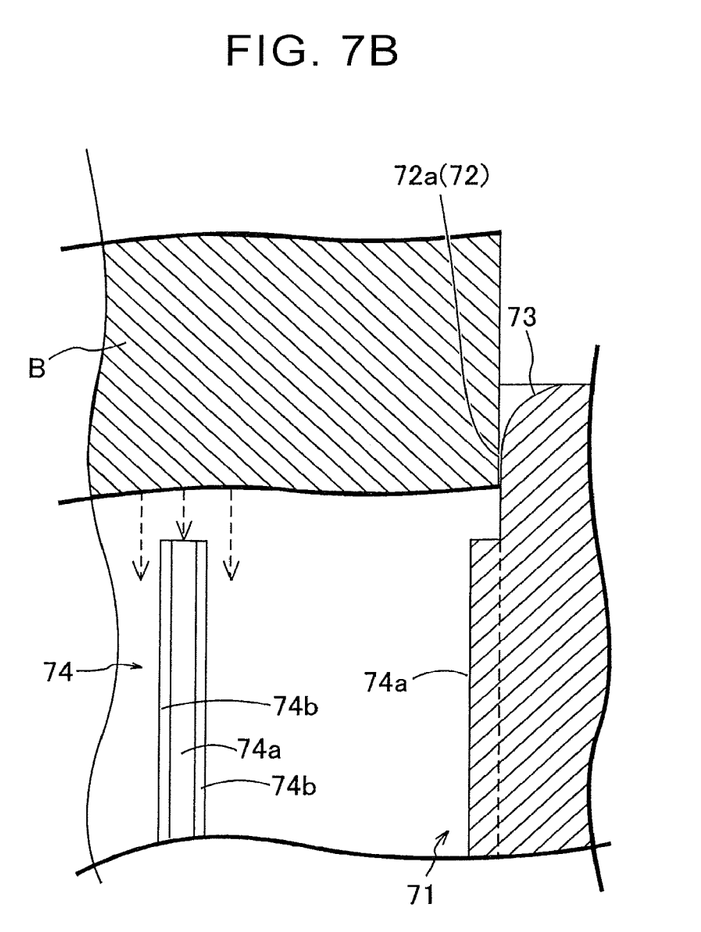
FIG. 7B illustrates a comparative example to be compared with FIG. 7A, illustrating a state in which the forming material is inserted into a regulation portion of a second die in which distal end teeth are not formed on a spline shaping portion.

In this respect, in the case where the distal end teeth 75 are not formed on the entrance side of the spline shaping teeth 74 as illustrated in FIG. 7B, for example, a part of the forming material B pushed out from the entrance side to contact end surfaces of the spline shaping teeth 74 that face the entrance side may be blocked by such end surfaces. In this case, the forming material B that has been blocked cannot be moved into the spline shaping portion 71, and resides inside the regulation portion 72. As a result, the forming material B that resides inside the regulation portion 72, of the forming material B after being subjected to the finish forging, remains like a bump on the cup portion 11 side with respect to the spline shaft 13, while an underfill is caused in the spline teeth 13a.

In the present embodiment, in particular, the forging in the forging step (S2) is warm forging, and the hardness of the forming material B is low compared to the case of cold forging. Hence, the forming material B that contacts the end surfaces of the spline shaping teeth 74 that face the entrance side is easily deformable and easily blocked by such end surfaces compared to the case of cold forging.

In view of this, the spline shaping portion 71 is provided with the distal end teeth 75, and the distal end teeth 75 are each formed such that the width wb of the pair of distal end tooth side surfaces 75b becomes smaller toward the entrance side. Consequently, the second die 70 allows the forming material B that has been pushed out into the spline shaping portion 71 to flow toward both sides, in the circumferential direction, of the spline shaping teeth 74 while preventing the forming material B that has been pushed out toward the spline shaping portion 71 from residing inside the regulation surface 72a. Hence, also with the forging that is warm forging, the second die 70 can prevent occurrence of an underfill in the spline teeth 13a in the forming material B after being subjected to the finish forging, which can enhance the precision in processing the spline shaft 13 through forging.

In addition, the distal end teeth 75 are formed such that the width wa of the distal end tooth top surface 75a becomes smaller toward the entrance side. The second die 70 can be shaped such that the respective distal ends of the distal end teeth 75 that face the entrance side are more pointed. In the present embodiment, in particular, the respective end portions of the distal end teeth 75 on the entrance side are each formed in a pointed spear shape such that the distal end tooth top surface 75a and the distal end tooth side surfaces 75b converge at one point. Consequently, the distal end teeth 75 allow the forming material B that has been pushed out into the spline shaping portion 71 to easily flow toward both sides, in the circumferential direction, of the spline shaping teeth 74.

In the second die 70, further, the inside diameter of the regulation surface 72a is set so as to correspond to the outside diameter of a portion of the forming material B, which has been roughly formed, at which the spline shaft 13 is to be formed. In this case, the regulation surface 72a can regulate the forming material B, which has been inserted into the regulation surface 72a, being bulged in the radial direction. As a result, the forming material B that has been pushed out into the spline shaping portion 71 cannot reside inside the regulation surface 72a, and is easily guided toward the tooth grooves formed between the spline shaping teeth 74 that are adjacent to each other in the circumferential direction. Hence, the second die 70 can prevent occurrence of an underfill in the spline teeth 13a in the forming material B after being subjected to the finish forging.

5. Others

While the present disclosure has been described above on the basis of the embodiment described above, the applicable embodiment is not limited to the embodiment described above in any way. It is easily inferred that a variety of modifications and alterations can be made without departing from the scope and spirit of the present disclosure.

What is claimed is:

1. A method of manufacturing an outside joint member, the outside joint member including a cup portion in a bottomed tubular shape and a shaft portion that is a shaft-like portion extending from a bottom portion of the cup portion and that has a spline shaft having an outer peripheral surface on which spline teeth are formed, the manufacturing method comprising:

forging a forming material to form a shape of the cup portion and a shape of the spline shaft on the shaft portion simultaneously using a forging die, wherein the forging die includes a first die, a second die housed in the first die, and a third die disposed on an entrance side with respect to the first die and the second die, in which the first die, the second die, and the third die are disposed coaxially with each other, wherein the first die includes a first housing portion and a second housing portion provided on an entrance side of the first housing portion, the first housing portion including a first cylindrical inner peripheral surface with an inside diameter that is larger than an outside diameter of the forming material at which the shaft portion is formed, the second housing portion including a second cylindrical inner peripheral surface with an inside diameter that is larger than the inside diameter of the first cylindrical inner peripheral surface, the second die being housed inside the second housing portion, wherein the third die includes a third cylindrical inner peripheral surface with an inside diameter corresponding to an outside diameter of the cup portion, wherein the second die includes a spline shaping portion and a regulation portion, the spline shaping portion having an inner peripheral surface shape corresponding to an outer shape of the spline shaft and configured to shape the spline teeth at a portion at which the spline shaft is to be formed in the forging, and the regulation portion being provided on an entrance side with respect to the spline shaping portion and having a regulation surface that regulates displacement of the forming material in a radial direction, wherein the spline shaping portion includes spline shaping teeth and distal end teeth, the spline shaping teeth corresponding to a plurality of tooth grooves provided in the spline shaft, and the distal end teeth being provided continuously with the spline shaping teeth on the entrance side of the spline shaping portion, the distal end teeth becoming narrower toward the entrance side of the spline shaping portion, wherein each of the spline shaping teeth includes a shaping tooth top surface corresponding to a bottom surface of each of the tooth grooves of the spline shaft and a pair of shaping tooth side surfaces corresponding to side surfaces of each of the tooth grooves of the spline shaft, and wherein each of the distal end teeth includes a distal end tooth top surface and a pair of distal end tooth side surfaces, the distal end tooth top surface being provided continuously with the shaping tooth top surface on the entrance side of the spline shaping portion and becoming smaller in height toward the entrance side of the spline shaping portion, and the pair of distal end tooth side surfaces being provided continuously with the pair of shaping tooth side surfaces on the entrance side of the spline shaping portion and becoming smaller in width in a circumferential direction toward the entrance side of the spline shaping portion.

2. The method of manufacturing an outside joint member according to claim 1, further comprising performing rough forging of the forming material for the cup portion and the shaft portion, wherein the forging includes forging the forming material that has been subjected to the rough forging to form the shape of the spline shaft using the forging die simultaneously while performing finish forging of the cup portion and the shaft portion.

3. The method of manufacturing of an outside joint member according to claim 1, wherein the shape of the cup portion and the shape of the spline shaft are formed simultaneously by warm forging.

4. The method of manufacturing of an outside joint member according to claim 1, wherein the distal end tooth top surface becomes smaller in the width in the circumferential direction toward the entrance side of the spline shaping portion.

5. The method of manufacturing of an outside joint member according to claim 4, wherein the distal end teeth are configured such that the distal end tooth top surface and the distal end tooth side surfaces converge at one point at an end portion on the entrance side of the spline shaping portion.

6. The method of manufacturing of an outside joint member according to claim 1, wherein the regulation surface is a cylindrical inner peripheral surface that has an inside diameter corresponding to an outside diameter of the forming material that is inserted into the spline shaping portion in the forging.

7. The method of manufacturing of an outside joint member according to claim 6, wherein the second die includes a guide portion provided on an entrance side with respect to the regulation portion and having an inside diameter that becomes larger toward the entrance side of the guide portion.

* * * * *